United States Patent
Ng et al.

(10) Patent No.: US 7,734,746 B2
(45) Date of Patent: Jun. 8, 2010

(54) METHOD AND APPARATUS FOR CONFIGURING AND CONTROLLING NETWORK RESOURCES IN CONTENT DELIVERY WITH DISTRIBUTED RULES

(75) Inventors: Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 1526 days.

(21) Appl. No.: 10/506,680

(22) PCT Filed: Mar. 17, 2003

(86) PCT No.: PCT/JP03/03140

§ 371 (c)(1),
(2), (4) Date: Jan. 4, 2005

(87) PCT Pub. No.: WO03/078459

PCT Pub. Date: Sep. 25, 2003

(65) Prior Publication Data
US 2005/0111467 A1 May 26, 2005

Related U.S. Application Data (60) Provisional application No. 60/364,585, filed on Mar. 18, 2002.

(51) Int. Cl.
*G06F 15/173* (2006.01)
(52) U.S. Cl. .................................. 709/223; 709/220
(58) Field of Classification Search .................. 709/201, 709/203, 220–221, 223
See application file for complete search history.

(56) References Cited

U.S. PATENT DOCUMENTS

| 5,781,534 A | 7/1998 | Perlman et al. |
| 6,718,361 B1 * | 4/2004 | Basani et al. ............... 709/201 |
| 6,973,488 B1 * | 12/2005 | Yavatkar et al. ............ 709/223 |

(Continued)

FOREIGN PATENT DOCUMENTS
WO          01/77841          10/2001

OTHER PUBLICATIONS
P. Srisuresh et al., "Middlebox Communication Architecture and Framework", Internet Engineering Task Force, Feb. 28, 2002, pp. 1-35.

(Continued)

*Primary Examiner*—Faruk Hamza
(74) *Attorney, Agent, or Firm*—Greenblum & Bernstein P.L.C.

(57) ABSTRACT

An intermediate network element deployed in a content delivery network is disclosed. The content delivery network cooperates its content delivery effort with other intermediate network element with similar capabilities. Distributing rules that govern the operations of the intermediate network element(s) are presented. These include the framework of the intermediate network element(s), the format of indicating part or whole of a rule specification to be distributed, the format of signatures for intermediate network elements to discover each other, the format of signaling other intermediate network elements that a rule is distributed to, and the method of determining the intermediate network element to distribute a rule to. In addition, authoring rules that are specific to real time streaming of contents are disclosed. A set of rule evaluation conditions are revealed that can be triggered based on different criteria during the streaming of real time contents. A set of parameters from which rules can be based on is disclosed.

21 Claims, 7 Drawing Sheets

U.S. PATENT DOCUMENTS

| | | | | |
|---|---|---|---|---|
| 6,983,326 | B1 * | 1/2006 | Vigue et al. | 709/229 |
| 7,080,141 | B1 * | 7/2006 | Baekelmans et al. | 709/224 |
| 7,099,932 | B1 * | 8/2006 | Frenkel et al. | 709/223 |
| 7,376,154 | B2 * | 5/2008 | Ilnicki et al. | 370/488 |
| 7,496,649 | B2 * | 2/2009 | Lee et al. | 709/223 |
| 7,610,612 | B2 * | 10/2009 | Ishibashi et al. | 726/2 |

OTHER PUBLICATIONS

A. Beck et al., "IRML: A Rule Specification Language for Intermediate Services; Version 02", IETF Internet Draft, Nov. 21, 2001, pp. 1-27.

C.W. Ng et al., "Quality of Service Extension to IRML", IETF Internet Draft, Jul. 2001, pp. 1-13, downloaded from http://www.globecome.net/ietf.

A. Barbir et al., "Requirements for an OPES Service Personalization Callout Server", IETF Internet Draft, Mar. 7, 2002, pp. 1-25, downloaded from http://www.globecome.net/ietf.

W.-Y. Ma et al., "Content Services Network: The Architecture and Protocols", Proceedings of the Sixth International Workshop on Web Caching and Content Distribution, Jun. 20, 2001, pp. 1-9, downloaded from http://www.cs.bu.edu.

C.W. Ng et al., "Sub-System Extensions to IRML", IETF Internet Draft, Jun. 2001, pp. 1-8, downloaded from http://www.globecome.net/ietf.

"Internet Content Adaptation protocol (ICAP)", International Conference on Antennas and Propagation, Jul. 30, 2001, pp. 1-13.

H. Schultzrinne, "RTP: A Transport Protocol for Real-Time Applications", Network Working Group Request for Comments, Jan. 1, 1996. Applicants note that this document is cited on p. 3 of the specification of the present application.

C.W. Ng et al., "QoS and Delivery Context in Rule-Based Edge Services", 7$^{th}$ International Workshop on Web Content Caching and Distribution, Aug. 14, 2002, downloaded from http://2002.iwcw.org.

"Overview of the IETF", downloaded from ttp://www.ietf.org/overview.html, 3 pages.

"Device Independence Principles : W3C Working Draft Sep. 18, 2001", downloaded from http://www.w3.org/TR/di-princ/, 28 pages.

R. Fielding et al., "Hypertext Transfer Protocol—HTTP/1.1", Jun. 1999. Applicants note that this document is cited on p. 2 of the specification of the present application.

H. Schulzrinne et al., "Real Time Streaming Protocol (RTSP)", Apr. 1998. Applicants note that this document is cited in the paragraph bridging pp. 2 and 3 of the specification of the present application.

H. Schulzrinne et al., "RTP: A Transport Protocol For Real-Time Applications", Jan. 1996. Applicants note that this document is cited on p. 3 of the Specification of the present application.

R. Gimson et al., "Device Independence Principles", Sep. 1, 2003. Applicants note that this document is cited on p. 4 of the specification of the present application.

G. Tomlison et al., "A Model for Open Pluggable Edge Services", Nov. 20, 2001. Applicants note that this document is cited on p. 4 of the specification of the present application.

* cited by examiner

```
ContentPath = {
    source = "foo.user.com"
    destination = "foo.server.com"
    protocol = ...
    num_nodes = 2
    nodes[0] = {
        hostname = "foo3.bar.com"
        capabilities = ...
    }
    nodes[1] = {
        hostname = "foo2.bar.com"
        capabilities = ...
    }
}

ContentPath = {
    source = "foo.server.com"
    destination = "foo.user.com"
    protocol = ...
    num_nodes = 2
    nodes[0] = {
        hostname = "foo5.bar.com"
        capabilities = ...
    }
    nodes[1] = {
        hostname = "foo6.bar.com"
        capabilities = ...
    }
}
```

METHOD AND APPARATUS FOR CONFIGURING AND CONTROLLING NETWORK RESOURCES IN CONTENT DELIVERY WITH DISTRIBUTED RULES

CROSS-REFERENCE TO RELATED APPLICATIONS

This application claims the benefit of U.S. Provisional Application No. 60/364,585, filed Mar. 18, 2002.

TECHNICAL FIELD

The invention relates to the field of content delivery in a data communications network. More particularly, this invention pertains to the distributed control of data packets stream flowing through an intermediate network element, and the distributed control and configuration of network resources at a hierarchy of the intermediaries. The main intended use of this invention is to act as a proxy for content streaming, and providing content adaptation services in a distributed manner.

BACKGROUND ART

Over the past decade, the Internet, or more specifically, the Internet Protocol (IP) based network, has seen a tremendous growth. The proliferation of the Internet and the increasing number of Internet users has resulted in extension and scaling problems for applications. This is especially true for applications designed for end-users, such as the World Wide Web (WWW), and audio-visual streaming. The increased in network bandwidth and processing power can hardly catch up with the demands of the increasing number of Internet users. This has resulted in longer load time for WWW page request, and lost of quality in real-time audio-visual playback across the Internet. The effort to reduce such undesirable effects has led to a wide deployment of intelligent network elements at the network edge (i.e. nearer to the end-users).

The most common use of such intermediate network elements are to function as caching proxies, such as hyper text transfer protocol (HTTP) proxies and/or caches as described in an article "Hypertext Transfer Protocol—HTTP/1.1", IETF RFC 2616, June 1999, by Fielding, R., Gettys, J., Mogul, J., Frystyk, H., Masinter, L., Leach, P., and T. Berners-Lee. These have been successful in reducing the network load at the WWW server and accelerating WWW contents delivery to the end-users. However, as the number of end-users increases, the variety of web-browser configurations and platforms widens. Similarly, the range of web contents is also broadening. Simply replicating static web contents cannot hope to sustain the ever-increasing demands from the end-users.

In addition, there has also been a noted increase in the deployment of multimedia streaming over the Internet. These usually employ the real-time streaming protocol (RTSP) as session protocol to set up and tear down communications channel, and real-time transport protocol and real-time control protocol (RTP/RTCP) for the actual transmission of content data. The RTSP is disclosed for example, in "Real Time Streaming Protocol (RTSP)", IETF RFC 2326, April 1998, by Schulzrinne, H., Rao, A., and Lanphier, R. The RTP/RTCP is disclosed for example, in "RTP: A Transport Protocol for Real-Time Applications", IETF RFC 1889, January 1996, by Schulzrinne, H., Casner, S., Frederick, R., and Jabcobson, V. Because of the versatile nature of Internet traffic, adaptation of the multimedia stream to the fluctuating traffic conditions is necessary to ensure a smooth presentation to the end-user. Though RTCP provides a means for end-users to report their communication status back to the sender, measures taken up by the sender based on receiver report can hardly be effective because the distance (network-sense) between the receiver and sender is often large. As most end-users connects to the Internet via an intermediary of some sort, for instance, firewall gateways, Network Address Translator (NAT), or proxies, the intermediary present a good choice to perform adaptation services on behalf of the content originator.

Furthermore, as the Internet grows, so does the range of devices that are used to access content from the Web. This diversification of browser types has accelerated with recent advancements in wireless Internet technology, in which tiny handheld devices such as digital personal assistants (PDA) and mobile phones have built-in micro-browsers that browse the Web, or play back audio/visual streams. Content authors can no longer develop content with the assumption that the created content will only be viewed by users using traditional desktop computers. Device independence is now a critical consideration, as disclosed in "Device Independence Principles", W3C Working Draft, September 2001, by Gimson, R., et al.

A number of international standardization organizations have recognized the need to provide services originally available only at the network core (where the servers are located) to the network edge (where the end users are located). For instance, the Internet Engineering Task Force (IETF) has recently set up working groups focusing on providing services at the network edges. The Open Pluggable Extensible Services (OPES) working group is one such effort. The OPES working group focuses on extending the current HTTP proxies from performing simple caching tasks to a whole suite of adaptation services. The framework of OPES is specified in "A Model for Open Pluggable Edge Services", IETF Internet Draft, Work In Progress, November 2001, by Tomlison, G., Chen, R., and Hofmann, M. There is also a Content Distribution Internetworking (CDI) working group that concentrates on collaborations between different content distribution networks (CDN). Such collaboration efforts are believed to be able to further accelerate the delivery of contents to the end user.

The current use of intermediaries in content delivery is mostly restricted to providing simple functionality such as HTTP caching, HTTP proxy, or RTSP proxy. This cannot hope to maintain the service level demanded by the users of today's Internet, as the number of end-users increases exponentially. Moreover, with the range of hardware devices and software agents employed to retrieve contents by different users are also broadening, content providers are finding it difficult to present to the users a coherent set of contents are that suited to the user's device and preferences.

Though various international bodies have recognized the above problems, and have acted to provide resolutions, their work could still be improved on. The OPES framework described in focused on the operations of a single intermediary, ignoring the current trend of collaborations between content delivery networks. In addition, though the idea of the OPES framework is to perform content adaptation so as to enhance the user experience in content retrieval, it focused only on parameters of the HTTP. This is not only inadequate for device independence, it also does not cater to the growing number of audiovisual streaming applications.

DISCLOSURE OF INVENTION

To solve the problem listed in section 3.3, the present invention allows content providers, access providers, and/or end-users to specify rules governing the delivery of content via intermediate network elements. These rules can be distributed to other intermediaries along the content flow path, to achieve the maximum efficiency and easier control of network resources. It is suitable for deployment by different content delivery networks, and can cooperate among one another. In addition, the current invention allows rules to be specified that are specially catered for real time content streaming. The present invention also defines a mechanism to extend rules to be construct based on user preferences, and device capabilities. Such a provision allows the rule author to construct rules that can better adapt contents to achieve device independence.

This invention involves the operations of one or more intermediate network elements performing content delivery and adaptation between end-users and the content providers. The intermediate network element (also known as intermediary) will parse each data packets transferred between the end-user and the contents provider. When the data packets matches certain criteria as specified by a set of rules registered with the intermediary, actions specified in the rules are carried out, usually results in the modification of the data packets. Rules in an intermediary can be distributed to other intermediaries which are more suited to evaluate the rule and/or perform the adaptations. In addition, rules can also cater specially to real time streaming protocol, or be constructed with delivery context parameters to achieve device independence.

BEST MODE FOR CARRYING OUT THE INVENTION

An apparatus and methods for distributed network resource management is disclosed. To facilitate understanding of the invention, the following definitions are used:

A "packet" is a self-contained unit of data of any possible format that could be delivered on a data network.

An "intermediary" and an "intermediate network element" are equivalent, and are used interchangeably, unless otherwise specified, to refer to a gateway, a router or an intelligent network hub for which this invention applies to.

The term "current intermediary" or "current intermediate network element" refers to an intermediate network element that is processing a data packet, or a rule specification, depending on the context the term is used in.

The terms "content server" and "content user" are used with respect to a sever-client model of information exchange. The content user, which is the client, will send a single or plural number of data packets to the content server containing a request. Such data packets are known as request packets. The content server upon processing the request would reply with a single or plural number of data packets containing the response. Such data packets are referred to as response packets.

In distribution of rules, the term "target intermediary" or "target intermediate network element" refers to the intermediate network element of the current invention receiving the distributed rule. The term "distributing intermediary" or "distributing intermediate network element" refers to the intermediate network element of the current invention distributing the rules to other intermediaries.

In the following description, for purpose of explanation, specific numbers, times, structures, and other parameters are set forth in order to provide a thorough understanding of the present invention. However, it will be apparent to anyone skilled in the art that the present invention may be practiced without these specific details.

Figure 1:
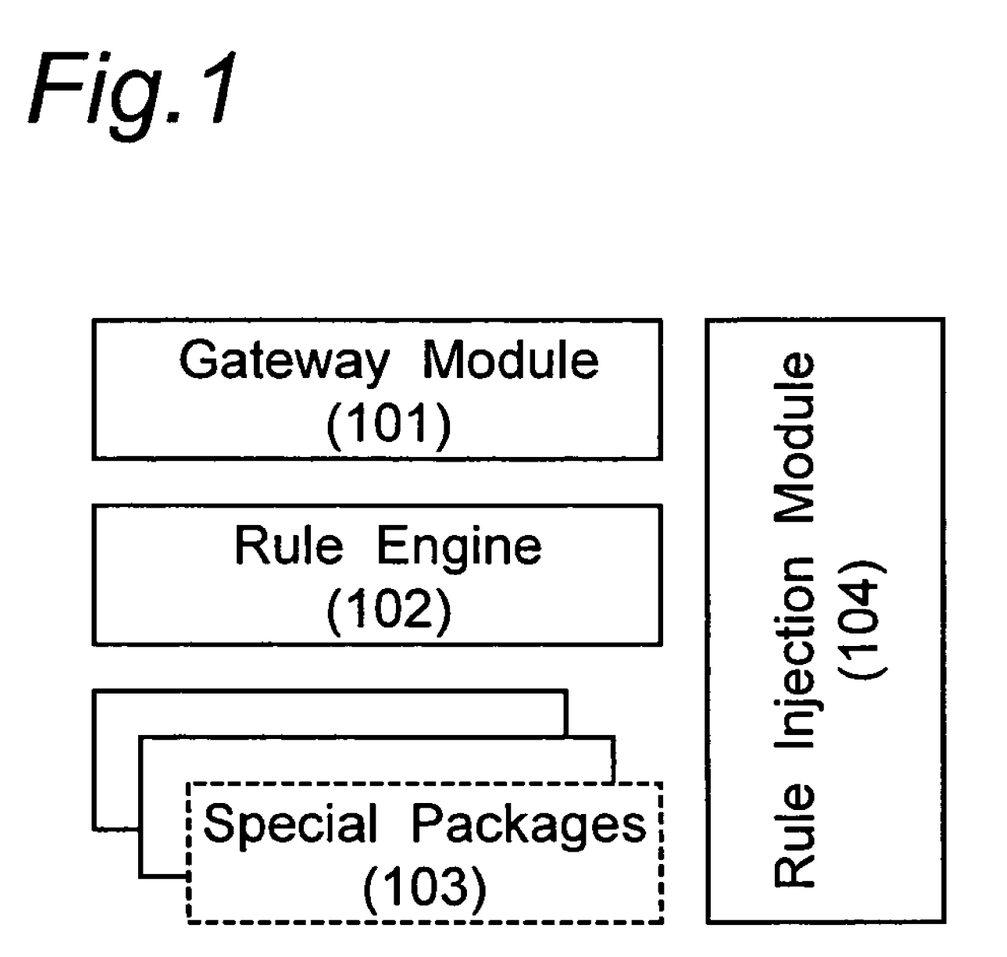
FIG. 1 is a framework of an Intermediate Network Element, showing the functional architecture of the intermediate network element as used in the invention.

The intermediate network element for which the current invention applies to, consists of the functional architecture as depicted in FIG. 1. The intermediary consists of a gateway module (101), a rule engine (102), a single or plural number of special packages (103), and the rule injection module (104).

The gateway module (101) is the collection of functional blocks that implement gateway or proxy functionalities. These can include, but not limited to, HTTP proxies and/or caches, RTSP proxies, RTP/RTCP mixers and/or translators, and application level gateways (ALG). For instance, we consider an intermediary performing the role of a HTTP proxy. The gateway module (101) would thus implements the functional component to handle HTTP connections from the client side, the functional components to establish a HTTP connection to the server, or another HTTP proxy, based on the client side request, and the functional component to relay responses from the server back to the client side. Effectively, the gateway module (101) is the functional component that implements the protocols (eg HTTP, RTSP) for which the intermediary is an active party of.

The rule engine module (102) parses through all or part of the data packets that passes through the intermediate network element and matches these data packets to a set of criteria specified by a singular or plurality of rules. This is known as evaluation of rules. These rules are specified in a logical unit known as a Rule Specification. A Rule Specification can contain a singular or plural number of rules. When a match is found, the corresponding action(s) specified in the rules is (are) triggered. This is known as the "firing of a rule". The action performed can include, but not limited to, inserting contents to the data packets, removing part or all of the contents from the data packets, and modifying contents in the data packets. These insertion, removal, and modification of packets contents can be carried out on the intermediary, or some other remote machines dedicated to perform packets transformations.

Examples of rules that are parsed by the Rule Engine (102) include rule which determines the bandwidth to be allocated to the data stream that the client is requesting. For instance, a rule may be specified in the following high-level form:
"If network channel of client <=1 Mbps, then allocate 10 kbits for data stream". (Rule 1)

The rule engine module (102) implements the functionality to parse such rules and determines if a match (i.e. if the end-user's network channel has a capacity is less than or equals to 1 Mbps) occurs. The above example also shows how the rules control the network resource allocation decisions.

Another example of rules being parsed by the rule engine module (102) will be to determine the next intermediary or server to contact in response to a client's request received from the gateway module (101). Here, base on the parameters of the request, the request may be routed to a different server/intermediary. For instance, consider the following high-level rules:
"If requested data is audio only, route request to foo3.bar.com"(Rule 2a)
"If requested data is audio and video, route request to foo4.bar.com" (Rule 2b)

The rule engine module (102) is responsible in parsing and interpreting such rules, and determining if one of condition is met. When one is met, the rule engine module (102) will inform the gateway module (101) which next intermediary/server is selected, and the gateway module (101), which implements the actual functionality to communicate with others using the specific protocol, would proceed to route the request to the selected next intermediary/server.

The intermediary in the current invention can have zero, single or plural number of special packages (103). These special packages (103) are modules designed to enhance the rule engine module (102) by providing specialized functionalities. For example, a Quality-of-Service (QoS) special package can be employed to assist the rule engine module (102) in understanding and evaluating rules that involves QoS parameters and conditions. The rule engine module (102) on its own can only parse rules and try to find a match on the conditions spelt out by the rule specifications. Using the example of (Rule 1a) above, the rule engine module (102) will need help to determine the actual capacity of the network channel of the client. A special package (103) for evaluating QoS parameters can be installed in the intermediary to evaluate such expression. The rule engine module (102) would query the QoS special package (103) when it parses a rule specification that specifies a QoS parameter (such as bandwidth, delay, etc). The QoS special package (103) evaluates the value of the parameter in question and passed it back to the rule engine module (102). From there, the rule engine module (102) can then proceed to check if a match has occurred in the condition specified by the rule specification. In this way, a modular design of the intermediary can be achieved. The rule engine module (102) performs the job of parsing rule specifications. It utilizes different special packages (103) to evaluate the value of a parameter that is specified in a rule specification, and from the values, determines if a condition is matched. In the current invention, a special package for evaluating rules based on delivery context is set forth.

The rule injection module (104) is a module that dynamically loads and unloads rules to and from the rule engine module (102). It also provides the interface for remote parties to dynamically register, activate or de-activate rules. This module is indispensable in supporting distribution of rules through various intermediaries.

Initially, when the intermediary starts up, the rule injection module (104) will load an initial set of rule specifications, based on a configuration file or otherwise, from the storage of the intermediary. The rules specifications will be loaded to the rule engine module (102). When a client request (or server response data) arrives; the gateway module will processing the clients request (or server response data), and pass it to the rule engine module (102) for rule parsing. The rule engine module (103) will parse the rule specifications and try to seek for a match in the conditions specified against the request (or response). While parsing these rules, the rule engine module (102) may require assistant from special packages (103) to evaluate the value of parameters.

The rule injection module (104) also allows rules to be dynamically loaded to the intermediary. For example, an administrator may remotely transfer a new set of rule specifications to be installed on the intermediary. Alternatively, the administrator may want to remotely remove a rule specification from the intermediary. The rule injection module (104) handles such remote operations. In addition, these operations need not be limited to human administrators. Indeed, the first portion of the current invention details the mechanism that allows rule specifications to be loaded and unloaded dynamically between intermediaries. The rule injection module (104) plays the role here of accepting connections from other intermediaries and handle requests to load or unload a rule specification to/from the rule engine module (102).

Figure 2:
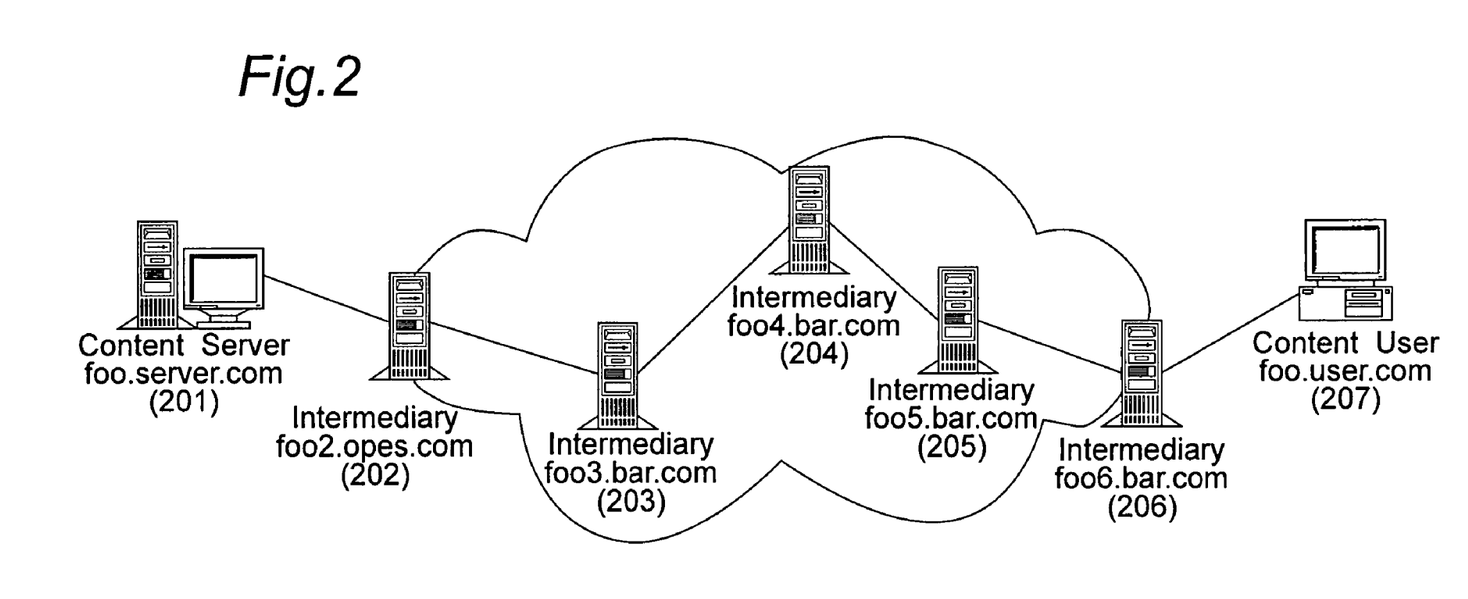
FIG. 2 shows nodes along the Content Path, and illustrates a typical content flow path from the content server to the content user, traversing a single or plural number of intermediaries.

Distribution of rules implies that rule specification(s) that is (are) loaded on one intermediary can be passed to another intermediary to be evaluated. Whole or part of the rule specification may be indicated to be distributed. These indications also suggested to which intermediary along the data flow path to distribute to. FIG. 2 shows a typical content flow path. Note that there may be other network elements performing relaying task along the content path that are not shown in FIG. 2. Along the path from the content server (201) to the content user (207), there may be a single or plural number of intermediaries (202-206) with the current invention employed.

Authors of the rule specification can indicate which intermediary along the content flow path to distribute the rule specification partially or wholly. Since it is unreasonable for authors to know how intermediaries are deployed in an actual real world situation, authors specify the preferred intermediary where the rule is distributed to by indicating the direction of the distribution, i.e. towards the source node or towards the destination node. The term "source" and "destination" are used with respect to the data packets. The source node is the node that generates the data packet, and the destination node is the node that consumes the data packet. In a server-client model, the directions may be specified as "towards server" or "towards client".

For example, using the deployment scenario as illustrated in FIG. 2, a rule specification is submitted to the intermediate network element foo4.bar.com (204). A part of the rule is indicated to be distributed towards the "destination". When processing a request packet, i.e. packet sent from the content user (207) to the content server (201) this portion of the rule specification can be distributed to the intermediary foo2.bar.com (202) or the intermediary foo3.bar.com (203). Conversely, when processing a response packet, the same portion of the rule specification can be distributed to the intermediate network element foo6.bar.com (206) or the network element foo5.bar.com (205). Similarly, when a part of the rule is indicated to be distributed towards the "server", it can be distributed to the intermediary foo2.bar.com (202) or the intermediary foo3.bar.com (203). Conversely, when a portion of the rule specification is indicated to be distributed towards the "client", that portion of the rule specification can be distributed to the intermediate network element foo6.bar.com (206) or the network element foo5.bar.com (205).

One objective of the current invention is to allow rule authors to be able to specify a rule hierarchy where the topmost level of the rule specification resides on one intermediary and the lower level portions of the rule specification reside on other intermediaries. This allows efficient control of the intermediary operations. Thus, in addition to specifying the direction at which distributed rules should flow (i.e. forward, backward, towards content server or towards content user), the current invention also allows rule authors to specify the approximate location in that direction where the rule should be distributed.

Using the above example, a rule author may specify the distributed portion of the rule specification to be distributed to the intermediary as near to the content user as possible. In FIG. 2, this implies the intermediary foo6.bar.com (206). Alternatively, a portion of the rule might be specified to be distributed to the intermediary one hop away from the element nearest to the content user. In FIG. 2, this implies the intermediate network element foo5.bar.com (205). Similarly, it is possible for the rule author to specify that a portion of the rule to be distributed to the next intermediary towards the content server. Using the previous example where the rule specification is submitted to foo4.bar.com (204), this means the rule author wanted the portion of the rule to be distributed to the network element foo3.bar.com (203).

The current invention covers all the afore-mentioned means of marking the rule specification for distribution. As an illustration, the following character-based indication methods are presented. It should be apparent to anyone skilled in the art that other forms of indications can be used to achieve equal effect, such as using numeric or alphanumeric codes. In the character-based indications, each indications is of the form <target direction>-<approximate location from target> or of the form <approximate location towards target>-<target direction> where <target-direction> is the term source, destination, server or client, and <approximate location from target> and <approximate location towards target> are numerical values indicating the number of intermediaries away from the specified target.

For instance, to indicate the portion of rule to be distributed to the intermediary nearest to the content server, the rule author may use an indication of server-1 to show that the rule should be distributed to the intermediary that is 1 hop away from the content server. When the indication of 2-server is used, the rule author expressed the desire to distribute the rule to an intermediary that is 2 hops away from the intermediary where the rule is loaded, towards the direction of the content server. Similarly, the indication client-2 indicates the rule should be distributed to the intermediate network element that is 2 hops away from the content user, and the indication 1-client indicates that the rule should be distributed to the next intermediary in the direction of the content user.

In order for intermediaries to distribute rule specifications among themselves, the intermediaries must have a way to first discover the existence of other intermediaries on a given content flow path. Each intermediary may also be connected to multiple content servers, content users and other intermediaries, thus discovery may not be feasible to be performed statically using configuration files, nor one-shot at system starts up.

The present invention requires that intermediary to embed an indication of their presence in the content as data packets flows from the content user to the content server and vice versa. Such an indication is known as the signature of the intermediary. These signatures should contain information of the intermediary, such as the resolvable hostname and the capabilities of the intermediary. Capability of the intermediaries should clearly indicate that the intermediary support distributed rules, and should also include information such as the special packages installed in the intermediary.

For example, in the HTTP and RTSP protocols, intermediaries can append their signature to the "Via" general header found in the request and response headers. An intermediary of hostname foo4.bar.com with installed QoS special package can insert the following "Via" header field as its signature:

Via: 1.1 foo4.bar.com (OPES=standard,qos,distributed)

For other protocols which do not have built-in mechanism for intermediaries to embed their signature, other means could be sought for. For instance, protocols usually provide the functionality for machines to embed optional information into the data packets (normally using optional extension headers). This can be used to carry signatures of the intermediary. In addition, the above example used character strings as the signature for ease of understanding. It should be apparent to anyone skilled in the art that other forms of signature can be used to achieve equal effect, such as using numeric or alphanumeric codes, so long as an external entity can extract the hostname and capabilities of the intermediary from the signature.

In both cases where the protocol built-in mechanism is used, or optional extension is used, multiple signatures should be allowed so that signature of each subsequent intermediary can be appended. In other words, when a data packet reach any given intermediate network element in the content flow path, the intermediate network element knows the other intermediaries the data packet has previously traversed. This also enables the intermediary to know the order of the intermediaries the packet traversed.

In a typical operation, there will be request flowing from the content user to the content server, and the response flowing from the content server to the content user. Intermediaries will thus know all other intermediaries along the content flow path once a pair of request and response data packets passed through them. For instance, using the scenario shown in FIG. 2, the intermediary foo4.bar.com (204) will know the existence of the intermediaries foo6.bar.com (206) and foo5.bar.com (205) when the request from the content user (207) reaches it. When the content response from the content server reaches foo4.bar.com (204), the intermediary will discover the existence of the intermediate network elements foo2.bar.com (202) and foo3.bar.com (203). Thus, the intermediary foo4.bar.com (204) will be able to detect the presence of other intermediate network elements in the entire content flow path.

Intermediaries will maintain a cache of known intermediaries network along any given content flow path. The reason for doing so is explained below. When an intermediary received a request, it may be necessary for it to distribute a rule to another intermediate network element towards the content server. If the intermediary relies only on the embedded signature to discover other intermediate network elements, it cannot know in advance other intermediaries in the forward path towards the content server, until it receives the content response. Should such a situation arise, the rule engine module (102) should check if it could retrieve information of intermediaries from its cache. If it can, then the rule can be distributed to a forward intermediary; else, the rule should be evaluated locally.

Figure 3:
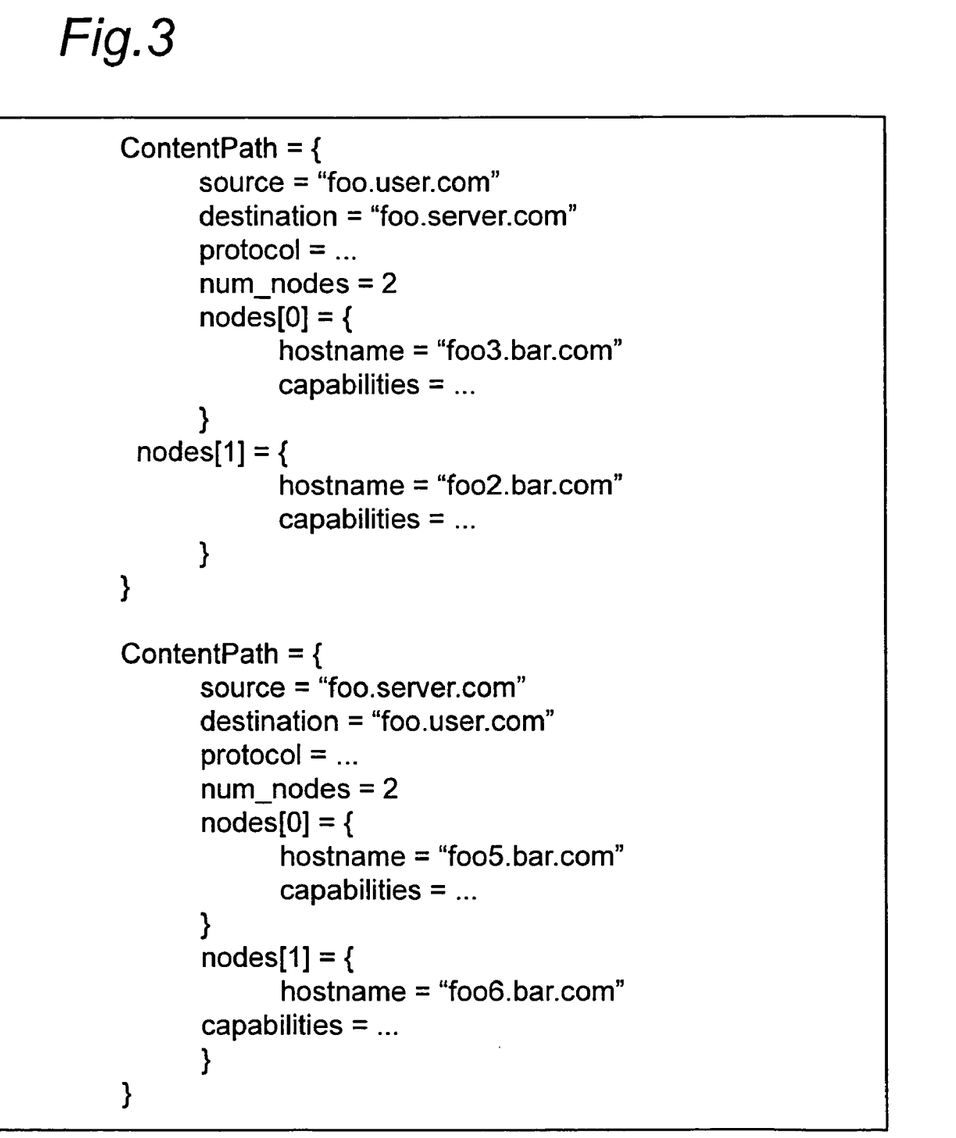
FIG. 3 shows example of ContentPath Structure, particularly showing the values stored in a ContentPath structure of the intermediary foo4.bar.com as marked by literal 204 in FIG. 2.

To maintain the cache, the data formats as shown in Data Format 1 and. Data Format 2 below can be used. Data Format 1 is used to record the host identification (stored in the field hostname) and capabilities (stored in the field capabilities) of the intermediary. Data Format 2 is used to record the list of known intermediaries along a given content flow path. The content flow path is uniquely specified by the source (stored in the field source), destination (stored in the field destination), and protocol (stored in the field protocol) triplet, expressed as {source, destination, protocol}. The num_nodes field store the number of intermediate network element that a data packet from the source node must traverse before reaching the destination node starting from (but excluding) the current intermediary, and the nodes array store the information of each of such intermediate network element. FIG. 3 illustrates a pair of ContentPath data formats stored in the intermediary foo4.bar.com (204) in the scenario depicted FIG. 2.

---
Data Format 1: Intermediary Entry
---
```
struct IntermediaryEntry {
    NodeID      hostname;
    char        capabilities[ ];
}
```
---

---
Data Format 2: Data Flow Path Information
---
```
struct ContentPath {
    NodeID              source;
    NodeID              destination;
    ProtocolType        protocol;
    int                 num_nodes;
    struct IntermediaryEntry    nodes[ ];
}
```
---

Figure 4:
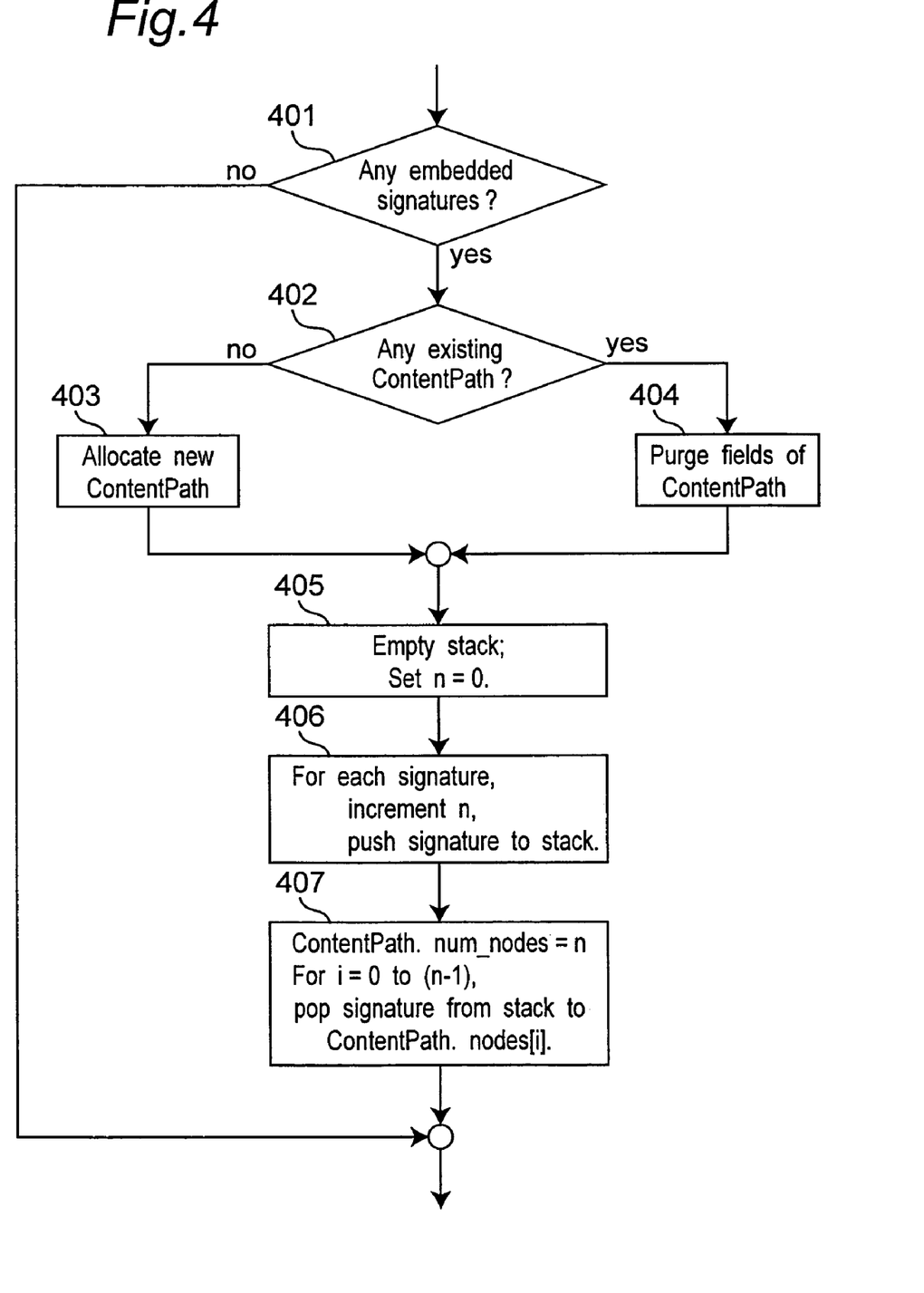
FIG. 4 shows a method of Extracting Intermediaries Information from Embedded Signature in Data Packets, particularly showing the flow diagram of the method to extract intermediaries' signatures in the data packets to construct/update the ContentPath structure.

FIG. 4 depicts the method devised to extract the intermediaries' signatures embedded in the data packets and construct/update the ContentPath structure. When a data packet arrives, the intermediary first check if there is any signature embedded, as shown in the step marked with literal 401. If there is one, a ContentPath structure is searched from the cache that matches the {destination, source, protocol}triplet, as shown in step marked with literal 402. Note that the source of the data packet is checked for against ContentPath.destination, and vice versa. The reason for this is because the ContentPath structure is used to give the list of intermediaries towards the destination node, whereas when extracting signatures from the data packets, the intermediaries are given from the source node. Thus, there is a need to swap the destination and source nodes when searching for a match.

If none can be found, a new ContentPath structure is allocated, as shown in step marked with literal 403. When a cached ContentPath structure is located, the num_nodes and nodes fields will be purged, as shown in the step marked with literal 404. A last-in-first-out stack to store the signatures temporarily is then initialised to be empty and the counter n is set to zero in the step marked with literal 405. In the step marked with literal 406, each embedded signature is extracted and pushed to the stack. In addition, the counter n is incremented to record the number of signatures extracted. When all signatures are extracted, the counter n will contain the number of intermediaries before the current network element in the content flow path. This is stored to the num_nodes field. Signatures in the stack are then popped out to update the nodes array, as shown in the step marked with literal 406.

Previous description has presented the method for intermediaries to discover other intermediaries along the content flow path. When a rule engine module parses a rule specification and found that a portion of the rule specification is marked to be distributed, it can then check the appropriate ContentPath structure (by using the content server, content user, and protocol triplet) and determine which remote intermediaries to distribute the rule to.

Figure 5:
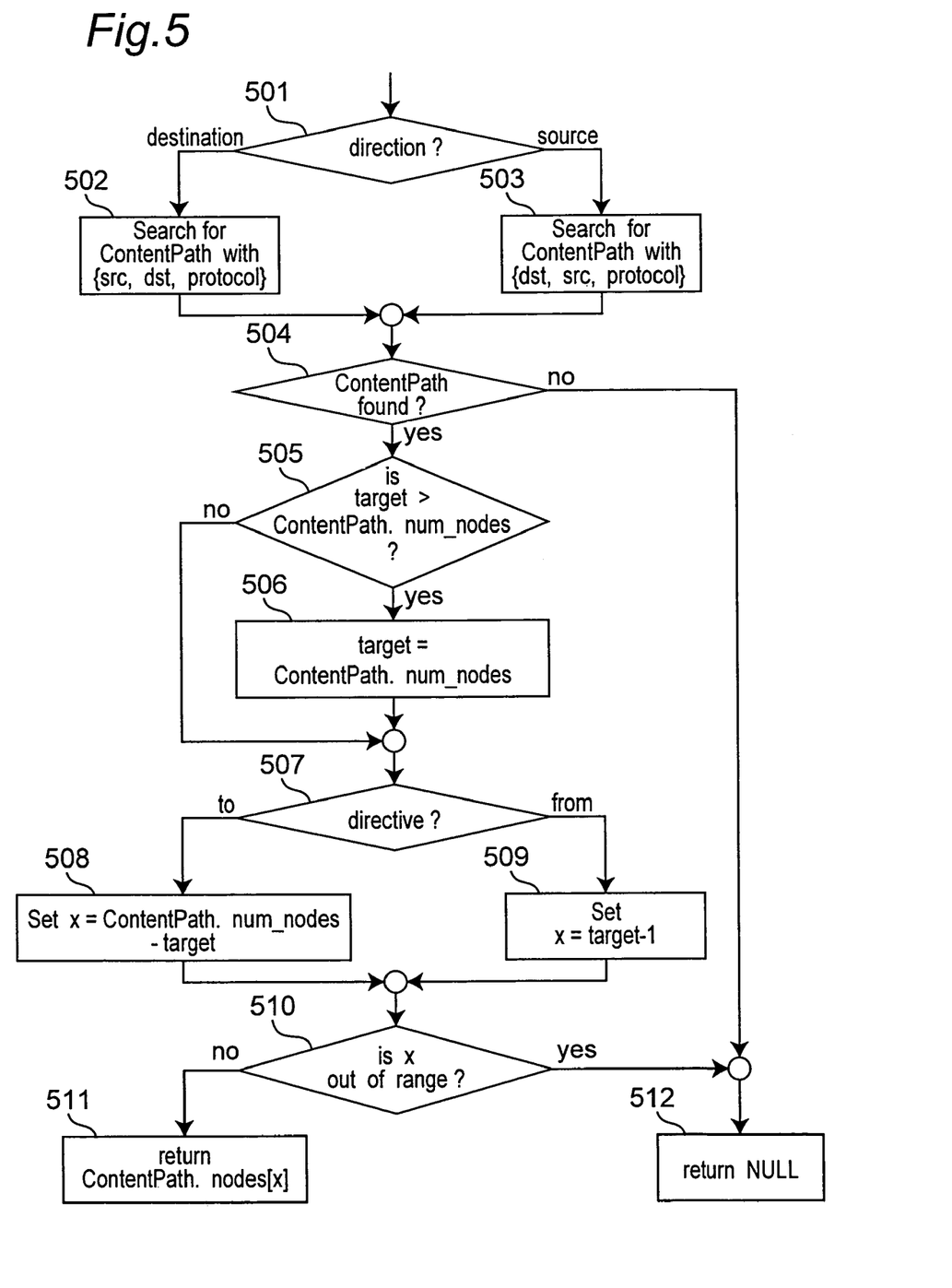
FIG. 5 shows a method of Determining the Remote Intermediary to Distribute Rule, particularly showing the algorithm used to determine the remote intermediary to distribute a rule to, given the distribution indication.

FIG. 5 shows the algorithm used to determine the remote intermediary to distribute the rule to, given the indication of distribution in the form of <target direction>-<approximate location from target> or
<approximate location towards target>-<target direction> as previously described. The term target is used to denote the numerical value of <approximate location towards target> or <approximate location from target>. The term directive contains the value "from" if the first form is used, and the value "to" if the second form is used. The term direction is the value "source" or the value "destination". The term src, dst and protocol refers to the source, destination and protocol extracted from the data packet respectively.

The algorithm first searches for the ContentPath data format as shown in the steps marked with 501 through 504. If the direction of distribution is towards the destination, the triplet {src, dst protocol} is used to locate the ContentPath, as shown in the step marked with literal 502. Else, the triplet {dst, src, protocol} is used instead, as shown in the step marked with literal 503. If no ContentPath can be found, the algorithm returns NULL, as shown in the step marked with literal 512. In the steps marked with 505 and 506, target in checked to prevent it from exceeding the number of remote intermediaries in the direction of distribution. In the step marked with literal 507, the distribution indication is checked to see if it is in the form <target direction>-<approximate location from target> or
<approximate location towards target>-<target directions For the first form, the numerical value indicates the number of intermediary from the end host (content server or content user). However, the intermediaries are listed in nodes array in the order of the direction towards the end node. Thus, in the step marked with literal 508, a temporary variable x is set to the number of intermediaries minus the numerical value target. Conversely, if the indication is in the second form, then the temporary variable x is set to the numerical value target minus 1, as shown in the step marked with literal 509. The reason to subtract one is because the first element in the nodes array is assumed to be nodes[0]. Anyone skilled in the art can easily modify the above formulae to suit other kinds of array arrangement. In the step marked with literal 510, the variable x is checked to see if falls out of range. If it does, the algorithm returns NULL to indicate no suitable remote intermediary can be found, as shown in the steps marked with literal 512. Else, the function returns the remote intermediary given in nodes [x], as shown in the step marked with literal 511.

Figure 6:
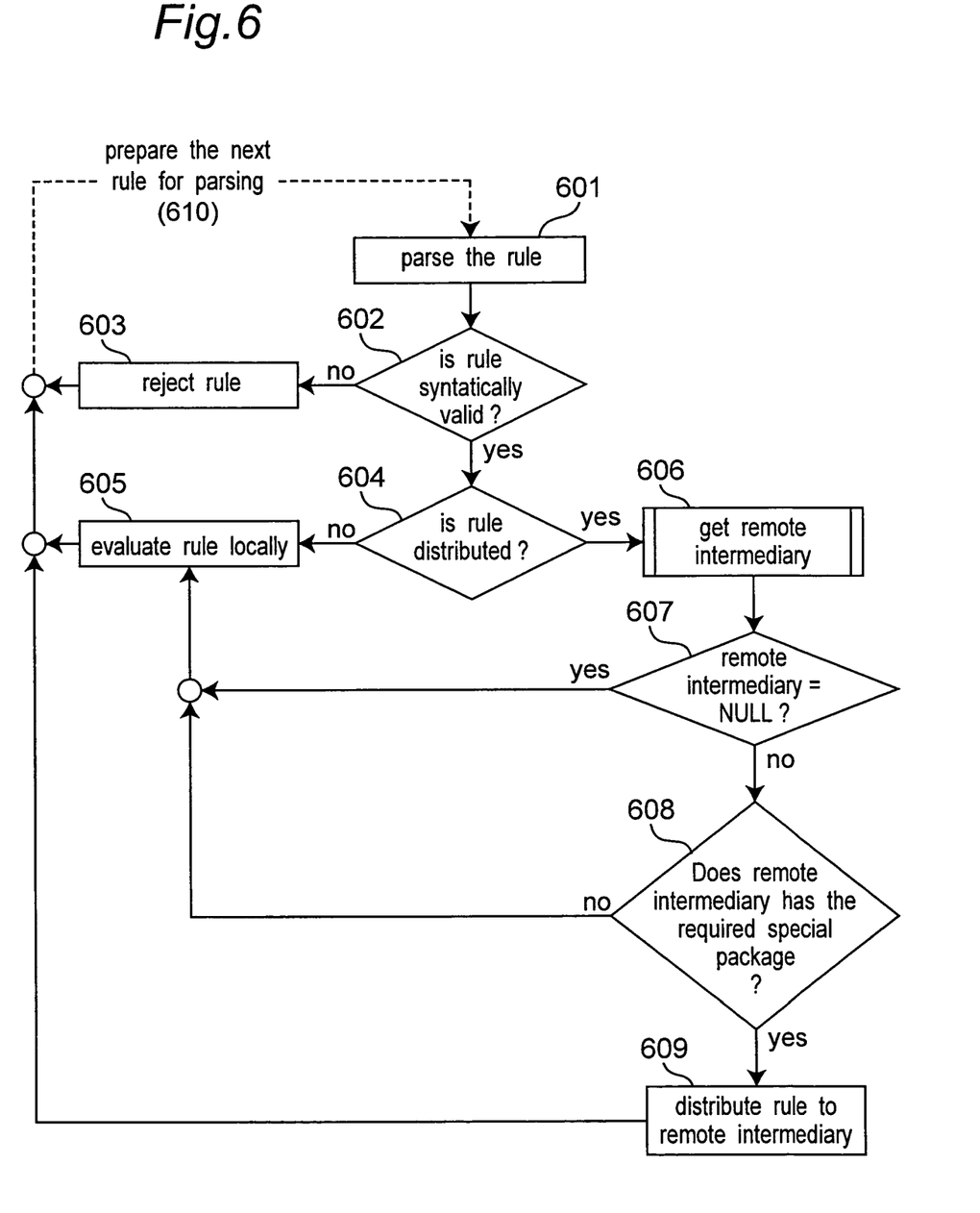
FIG. 6 shows a method of Parsing Rule with Distributed Rule Support, particularly showing the algorithm used to parse a rule with the focus on supporting distributed rules. The actually method of parsing the rule to check for syntactical validity and evaluation of the rule is outside the scope of this document.

FIG. 6 shows the method of parsing a rule specification with the consideration of distributing rules. The rule specification is first parsed to check for syntactical validity, and invalid rules are rejected, as shown in the steps marked with 601, 602, and 603. The rule is next checked to see if the it is marked to be distributed, as shown in step marked with literal 604. If it is not marked, the rule is evaluated locally (605).

Else, the algorithm depicted in FIG. 4 is used to identify the remote intermediary to distribute the rule to, as shown in the step marked with literal 606. If the algorithm returns NULL, that means no suitable remote intermediary can be found, then the rule is evaluated locally, as shown in steps marked with 607 and 605. When a remote intermediary is found, it is checked to see if it supports the special package required by the rule, as shown in step marked with literal 608. If it does not, the rule is evaluated locally (605). If it does, the rule is then distributed (609). The whole process is repeated for the next rule to be parsed (610).

Figure 7:
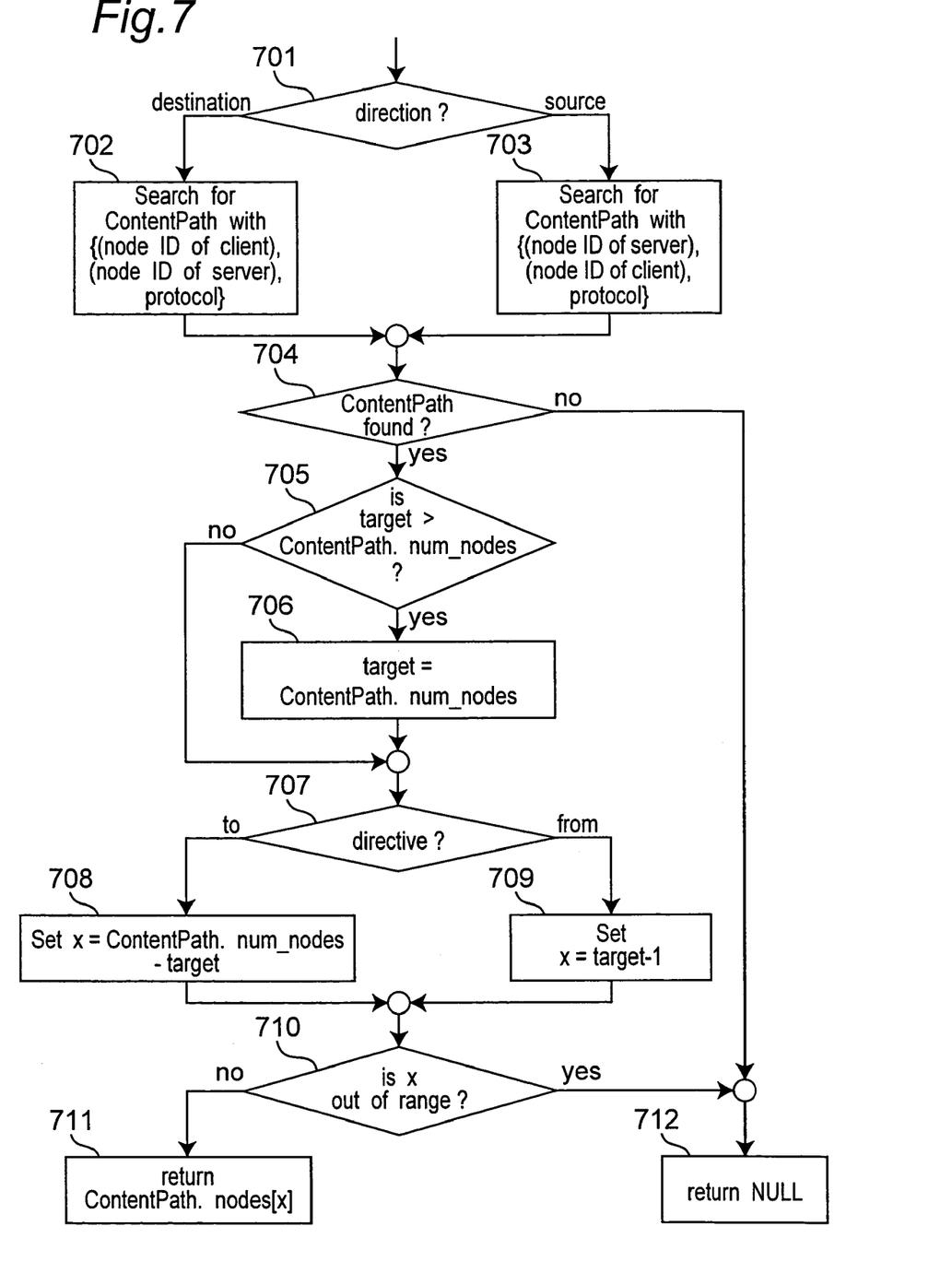
FIG. 7 shows a method of Determining the Remote. Intermediary to Distribute Rule in a Server-Client Model, particularly showing the algorithm used to determine the remote intermediary to distribute a rule to, given the distribution indication, in a server-client model.

If a server-client model is used, where the target direction can be specified by towards "server" or towards "client" instead, then the method of locating the target intermediary given in FIG. 5 can no longer be used. FIG. 7 shows the method for a server-client model. The only difference between the algorithm in FIG. 7 and the one in FIG. 5 is in the steps marked with literals 701 through 703, and the steps marked with literals 501 through 503. In the step marked with literal 701, the target direction is first checked if it is towards server or client. If the target direction is server, the ContentPath is searched using the {node identification of client, node identification of server, protocol} triplet, as shown in the step marked with literal 702. If the target direction is client, the ContentPath is searched using the {node identification of server, node identification of client, protocol} triplet, as shown in the step marked with literal 703. The remaining steps marked with literals 704 through 712 are identical to the steps marked with literal 504 through 512.

In order to distribute the rule, the intermediary needs to signal the receiving intermediary. For ease of explanation, the scenario that is illustrated in FIG. 2 is used. For the following discussion, the intermediary foo4.bar.com (204) is the network element that loads the rule, and it has determined that the rule needs to be distributed to the intermediary foo6.bar.com (206) for evaluation.

To signal foo6.bar.com (206), foo4.bar.com (204) can embed a signal into the data packet. The present invention requires that the embedded signal contain the identifier of the intermediary that is distributing the rule, the identifier of the intended intermediary receiving the rule, and the rule identifier that uniquely identifies the rule to be distributed. The rule identifier must uniquely identify the portion of the rule specification on a given intermediary that is to be distributed, and the identifier should not vary with time.

For example, in the HTTP and RTSP protocols, intermediaries can append tokens to the "Pragma" general header in the request and response headers. Thus, the current invention can make use of this to embed the required signals. For example, foo4.bar.com can append the following token OPES-distributed="foo6.bar.com:
  XYZABC@foo4.bar.com"; to the "Pragma" general header of the response. The token used is of the form OPES-distributed="<target>:<rule
  identifier>@<distributor>" where <target> refers the hostname of the intermediary to receive the distributed rule, <rule identifier> refers to the unique identifier to identify the distributed rule, and <distributor> refers to the intermediary that is distributing the rule.

For other protocols which do not have built-in mechanism for intermediaries to embed signals, other means could be sought for. For instance, protocols usually provide the functionality for machines to embed optional information into the data packets (normally using optional extension headers). This can be used to carry signals for intermediary. In addition, the above example used character strings as the signature for ease of understanding. It should be apparent to anyone skilled in the art that other forms of signature can be used to achieve equal effect, such as using numeric or alphanumeric codes, so long as an external entity can extract the hostname of the distributing intermediaries, hostname of the target intermediary and the rule identifier from the signal.

In both cases where the protocol built-in mechanism is used, or optional extension is used, multiple sign-als should be allowed so that two or more sets of rules can be distributed at a single passing of a data packet. Every intermediary must inspect the data packets to detect such signals, and check if the signal is intended for it. Once it determined the signal is intended for it, the intermediary can optionally remove the signal from the data packet.

The rule identifier is used to retrieve the actual rule from the distributing intermediary using a separate communications channel. The rule injection module (104) is responsible for establishing such a communications channel and retrieving/passing any distributed rule. The current invention does not specify the format of such a communications channel. Because the rule identifier is unique given a specified intermediary, intermediaries should cache the retrieved distributed rule using the rule identifier and the hostname of the distributing intermediary as a cache key. This eliminates the need to retrieve the same distributed rule should a subsequent distribution occur again.

The above mechanisms can be deployed for contents distribution where there is a plurality of sending and receiving nodes. Such situation is decomposed into multiple data flow paths, each containing one sending node and one receiving node. Note that this decomposition is only used for the construction of the ContentPath structure as described previously. When an actual data that arrives at an intermediary that is sent to plurality of receiving nodes, the intermediary can then decide on the rule distribution based on each ContentPath structure for each corresponding sending node (i.e. source) and receiving node (i.e. destination) pair. If the targeted intermediary to distribute a rule to happens to be the same, then a single signal can be embedded onto the content. If more than one target intermediary is identified (because the content path split somewhere along the line), one separate signal for each targeted intermediary can be embedded into the content.

In the previous descriptions, the intermediate network for distribution of rule is revealed. This document will, in the following discussions, turn to the next portion of the current invention, which narrows the deployment of the current invention to real time content streaming situation. In this situation, the content user sends a request to the content server, via a single or plural number of intermediary (intermediaries) which is (are) the object(s) of the current invention, to set up a real time session. When the content server accepts the request with an appropriate response, a communications channel is set up between the content server and the content user through the intermediary (intermediaries). This communications channel between the content server and content user is hereafter referred to as the content session. The content server starts transmitting data packets through the content session to the content user without any active request from the content user, until the content user sends a request, via the intermediary, to tear down the content session. Such data packets sent spontaneously by the content server are henceforth referred to as content packets. During the course of the transmission of content packets by the content server, the content user may or may not transmit information about the transmission statistics back to the content server. Such statistics are hereafter referred to as feedback packets.

One existing protocol that fits the above description is the Real Time Streaming Protocol (RTSP). However, the current invention can be applied to other protocols that exhibit the same behaviour previously described, as should be apparent to anyone skilled in the art.

For all known prior arts, rules are evaluated for each request and/or response packets that passes through the intermediary. The current invention extends this by providing the capability for rule authors to specify rules that are evaluated whenever a content packet passes through the intermediary, rules that are evaluated whenever a specifies multiple of content packets passes through the intermediary, rules that are evaluated when a feedback packet passes through the intermediary, and rules that are evaluated at a specified regular interval throughout the duration when the content session is established. To attain such provision, rule authors are allowed to tag each rule with a special attribute. For purpose of explanation, the attribute is referred to as the "evaluateOn" attribute. Table 1 below listed the possible values of the "evaluateOn" attributes. Anyone skilled in the art should recognized that the current invention can be deployed using other names.

TABLE 1

"evaluateOn" Attributes

| "evaluateOn" Attribute | Description |
|---|---|
| "request" | the rule is to be evaluated upon the reception by the intermediary of a request packet from the content user to the content server |
| "response" | the rule is to be evaluated upon the reception by the intermediary of a response packet from the content server to the content user |
| "content" | the rule is to be evaluated upon the reception by the intermediary of a content packet from the content server to the content user |
| "feedback" | the rule is to be evaluated upon the reception by the intermediary of a feedback packet from the content user to the content server |
| "x-contents" | the rule is to be evaluated upon the reception by the intermediary of x multiple number of content packets from the content server to the content user, where x is a specified numerical value |
| "t-seconds" | the rule is to be evaluated when a content packet is received upon elapsed of every t seconds interval for as long as the content session is established, where t is a specified numerical value |

The last part of the current invention concerns the employment of special packages (103). As described earlier, special packages (103) are modules that enable the rule engine module (102) to evaluate rules involving different set of parameters (such as Quality of Service). The current invention defines a new special package, known as the "Delivery Context" special package. This package will allow the rule engine module (102) to interpret rules that are constructed based on delivery context. Four major classes of delivery context are defined, as shown in Table 2 below. These are User Preferences, Agent Capabilities, Device Capabilities, and Natural Environment. User Preferences refers to information about the human user, including browsing preference, language preferences, display preferences, QoS preferences, age group and gender. Agent Capabilities provide information on the software agent, such as the agent type, supported formats, supported languages, and supported transport protocols. Device Capabilities refers to the information about the hardware device, which include the device type, processor speed and type, memory capacity, screen resolution and depth, and operating systems. Natural Environment provide information about the natural environment surrounding the end user, including whether the end user is indoor or outdoor, the end user's velocity, location of the end user, and illumination properties.

TABLE 2

Delivery Context Parameters

| Parameters | Values |
|---|---|
| *User Preferences* | |
| "browsing-preference" | descriptive text about the user's browsing preferences, such as text only, image sizes, handicaps accessibilities options, searching and filtering preferences |
| "language-preference" | descriptive text about user's order of language preferences |
| "display-preference" | descriptive text about user's color preferences, full screen or window |
| "age-group" | descriptive text about the user's age group |
| "gender" | descriptive text about the user's gender |
| "employment" | descriptive text about the user's job nature |
| *Agent Capabilities* | |
| "agent-type" | descriptive text about the software agent |
| "supported-formats" | descriptive text about the content formats supported, and content encoding supports |
| "supported-languages" | descriptive text about the language supported by the software agent |
| "supported-protocols" | descriptive text about the transmission protocols supported by the software agent, and whether it has multicasting, broadcasting capabilities |
| *Device Capabilities* | |
| "device-type" | descriptive text about the device type |
| "processor" | descriptive text about processor speed and family |
| "memory-capacity" | descriptive text about memory capacity of the physical and secondary memory |
| "screen" | descriptive text about resolution and depth |
| "operating-system" | descriptive text about the operating system type |
| *Natural Environment* | |
| "location" | descriptive text about the user's location, such as indoor or outdoor, and the locale |
| "mobility" | descriptive text about the user's mobility, whether fixed or moving, and the velocity if moving |
| "illuminations" | descriptive text about illuminations surrounding the end user |

The Delivery Context special package interprets rules that are constructed using parameters that are from delivery context. There are various methods where the delivery context special package can obtain the actual values of the parameters. One method is to establish a communications channel with an external entity that provides knowledge of such parameters, for example the content user. For parameters such as the Device Capabilities, it might be necessary to obtain it from the content user directly. An alternative method is to obtain it from another module that resides on the intermediary. This module may gather the values locally, load the values from a storage device or request the values from an external entity. For parameters such as the Natural Environment, the intermediary may be able to deduce the information on its own, especially when the intermediary is located near the content user. For parameters such as the User Preferences, the human user may have registered a set of profiles to be stored at the intermediary.

The invention allows intermediate network elements along a content flow path to actively collaborate their content delivery efforts to enhance user experience in content retrieval. With more and more content delivery networks (CDN) deployed in the Internet, the invention disclosed in this document allows intermediaries of such CDNs to orchestrate their efforts by the provision of distributed rules. Rules loaded on one network element can be distributed to other intermediaries in real time, so that adaptation of data contents and contents request can be performed at a more suitable node. It also allows better control over the operations of content delivery.

In addition, the disclosed invention contains methods and means which are specific to the real-time delivery of Audio Visual content in a packet switch network. This allows rule authors to create rules that can react to fluctuations in the network conditions of the content streaming more speedily. Authors can also create rules that are based on the device capabilities and user preferences of the content consumers. When such rules are authored carefully with suitable adaptation services, the overall user experience in content retrieval will be significantly enhanced.

The invention claimed is:

1. A network control framework apparatus for controlling resources at an intermediate network element connecting at least two communications networks, comprising:
   a gateway providing gateway functionality;
   a rule engine that performs a network resource control decision based on at least one specified rule, the at least one specified rule being specified according to a rule specification format;
   at least one special package added to the rule engine that provides a specialized functionality to the rule engine;
   a rule injector that injects or removes the at least one specified rule to or from the rule engine; and
   a distributor that distributes the at least one specified rule to the intermediate network element, comprising:
      a distributor that distributes indications that indicate whether at least part of the at least one specified rule is to be distributed;
      a distributor that distributes a signature embedded in a data packet to announce capabilities of the intermediate network element that the data packet traversed;
      a parser that parses the at least one specified rule to determine whether at least part of the at least one specified rule is distributed;
      an identifier that identifies a target network element to distribute at least part of the at least one specified rule;
      a distributor that distributes signaling data embedded in the data packet that informs the target network element to distribute at least part of the at least one specified rule; and
      a retriever that retrieves at least part of the at least one specified rule distributed to the target network element from the intermediate network element that distributes at least part of the at least one specified rule.

2. The network control framework apparatus as recited in claim 1, wherein a format of the indications for the at least one specified rule for distribution comprises:
   a specification of a direction of distribution by specifying an endpoint of the direction;
   a specification of a number of intermediate network elements between a starting point and the endpoint; and
   at least one of a specification of the number of intermediate network elements from the endpoint, and specific content distributed at the intermediate network elements.

3. The network control framework apparatus as recited in claim 1, wherein a format of the signature embedded in the data packet comprises:
   an identification of the intermediate network element specified by the signature;
   the at least one special package that is installed on the one intermediate network element specified by the signature; and
   an indication that specifies a capability of accepting or generating at least part of the at least one specified rule for distribution.

4. The network control framework apparatus as recited in claim 1, wherein the signature of the intermediate network element that the data packet traversed are stored with a starting point and an endpoint that the data packet traversed corresponding to a traversal order for the data packet and a transmission protocol to which the data packet belongs.

5. The network control framework apparatus as recited in claim 1, wherein a format of the signature embedded in the data packet comprises:
   an identification of the intermediate network element; and
   an identification of the at least one special package installed on the intermediate network element.

6. The network control framework apparatus as recited in claim 1, wherein a format of the signature embedded in the data packet comprises:
   an identification of an endpoint that the data packet flows to;
   an identification of a starting point that the data packet flows from;
   a transmission protocol to which the data packet belongs;
   a signature array of intermediate network elements in an order corresponding to a traversal order of the data packet, from one intermediate network element where the format of the signature embedded in the data packet is stored, to the endpoint; and
   a number of signatures of the intermediate network elements in the order corresponding to the traversal order of the data packet from the one intermediate network element where the format of the signature embedded in the data packet is stored to the endpoint.

7. The network control framework apparatus as recited in claim 1, further comprising:
   a signaler that signals the intermediate network element to express a desire to distribute a collection of specified rules to the intermediate network element, comprising:
      an identification of an intermediate network element to which the collection of specified rules is distributed;
      an identification of an intermediate network element from which the collection of specified rules is distributed; and
      an identification of the collection of specified rules.

8. The network control framework apparatus as recited in claim 1, further comprising:
   a retriever that retrieves a collection of specified rules, from the intermediate network element that distributes the collection of specified rules, by the intermediate network element to which the collection of specified rules is distributed, comprising:
      a channel establisher that establishes a communication channel between the intermediate network element where the collection of specified rules is distributed to and the intermediate network element where the collection of specified rules is distributed from;
      an identification provider that provides an identification of the collection of specified rules that is distributed via the communication channel by the intermediate network element to which the collection of specified rules is distributed; and a transmitter that transmits the collection of specified rules that is distributed via the communication channel by the intermediate network element from which the collection of specified rules is distributed.

9. The network control framework apparatus as recited in claim 1, wherein the at least two communications networks comprise a client node that sends a request to a server node via the intermediate network element,
  wherein the server node accepts the request with a response,
  wherein the at least two communications networks further comprise a channel establisher that establishes a communications channel between the server node and the client node through the intermediate network element,
  wherein the server node transmits data packets through the communications channel to the client node until the client node sends a request, via the intermediate network element, to teardown the communications channel, and
  wherein the client node transmits information related to transmission statistics to the server node.

10. The network control framework apparatus as recited in claim 9, further comprising:
  an author provider that provides an author of the at least one specified rule to trigger least one specified rule at the intermediate network element based on a control method, the control method comprising:
  a rule to be evaluated when the intermediate network element receives the request from the client node destined for the server node;
  a rule to be evaluated when the intermediate network element receives the response from the server node destined for the client node;
  a rule to be evaluated when the intermediate network element receives a data packet containing a content sent by the server node to the client node through the communications channel established between the server node and the client node;
  a rule to be evaluated when the intermediate network element receives a data packet containing the information related to transmission statistics from the client node to the server node;
  a rule to be evaluated when the intermediate network element receives a specified number of data packets containing the content sent by the server node to the client node through the communications channel established between the server node and the client node; and
  a rule to be evaluated when the intermediate network element receives a data packet containing the content sent by the server node to the client node through the communications channel established between the server node and the client node after a lapse of a specified timer value measured by a recurrent timer.

11. The network control framework apparatus as recited in claim 1, further comprising:
  a controller that uses a set of parameters in the at least specified rule to control a content or a content delivery session to achieve device independence in delivering the content, comprising:
  a set of user preference parameters comprising preferences of a human user that consumes the content;
  a set of agent capabilities parameters comprising capabilities of a software agent employed by the human user to retrieve the content;
  a set of device capabilities parameters comprising capabilities of hardware employed by the human user to retrieve the content; and
  a set of natural environment parameters comprising information about an environment in which the human user retrieves the content.

12. The network control framework apparatus as recited in claim 11, wherein the set of user preference parameters comprises:
  a preference for the human user that relates to a method of retrieving the content;
  a preference for the human user that relates to a language used in the retrieved content;
  a preference for the human user that relates to presenting the retrieved content;
  an age group of the human user that retrieves the content;
  a gender of the human user that retrieves the content; and
  an employment status of the human user that retrieves the content.

13. The network control framework apparatus as recited in claim 11, wherein the set of agent capabilities parameters comprises:
  a type of the software agent employed by the human user to retrieve the content;
  a content format supported by the software agent employed by the human user to retrieve the content;
  a content language supported by the software agent employed by the human user to retrieve the at least one content; and
  a transmission protocol supported by the software agent employed by the human user to retrieve the at least one content.

14. The network control framework apparatus as recited in claim 11, wherein the set of device capabilities parameters comprises:
  a type of the hardware employed by the human user to retrieve the content;
  a processor speed and processor family of the hardware employed by the human user to retrieve the content;
  a memory capacity of a physical storage and a secondary storage of the hardware employed by the human user to retrieve the content;
  a display depth and a resolution of the hardware employed by the human user to retrieve the content; and
  an operating system that runs on the hardware employed by the human user to retrieve the content.

15. The network control framework apparatus as recited in claim 11, wherein the set of natural environment parameters comprises:
  information related to a location where the human user is retrieving the at least one content;
  information related to a mobility of the human user that retrieves the content; and
  information related to a lighting condition in which the human user is retrieving the content.

16. The network control framework apparatus as recited in claim 11, wherein the at least one special package is capable of interpreting and evaluating the at least one specified rule.

17. The network control framework apparatus recited in claim 1, wherein said network control framework apparatus is utilized in a communications network.

18. A network control framework method for controlling resources at an intermediate network element connecting at least two communications networks, comprising:
  providing a gateway functionality by a gateway;
  performing a network resource control decision by a rule engine based on at least one specified rule, wherein the at least specified rule is specified according to a rule specification format;

offering a specialized functionality to the rule engine by at least one special package added to the rule engine;

injecting or removing the at least one specified rule to or from the rule engine by a rule injector; and distributing the at least one specified rule to the intermediate network element by:
- distributing indications in the at least one specified rule to indicate whether at least part of the at least one specified rule is to be distributed;
- distributing a signature embedded into a data packet to announce a capability of the intermediate network element that the data packet traversed;
- parsing the at least one specified rule to determine whether at least part of the at least one specified rule is distributed;
- identifying a target network element to distribute at least part the at least one specified rule;
- distributing a signal embedded into the data packet to inform the target network element to distribute at least part of the at least one specified rule; and
- retrieving at least part of the at least one specified rule distributed to the target network element from the intermediate network element that distributes the at least part of the at least one specified rule.

19. The network control framework method as recited in claim 18, further comprising:

extracting the signature embedded in the data packet, by:
- checking for the signature embedded in the data packet;
- checking for a signature formatted according to a predetermined data format that is previously stored and has a matching starting point, an endpoint and a transmission protocol;
- allocating a new data format when there is no predetermined data format that is previously stored specifying the starting point, the endpoint and the transmission protocol;
- purging data stored in the predetermined data format having the matching starting point, the endpoint and the transmission protocol;
- preparing a last-in-first-out data structure;
- extracting the signature embedded in the data packet and pushing the signature onto the last-in-first-out data structure;
- removing each element in the last-in-first-out data structure and recording each element in the predetermined data format; and
- recording a number of signatures extracted, in the predetermined data format.

20. The network control framework method as recited in claim 18, further comprising:

parsing the at least one specified rule to determine whether at least part the at least one specified rule is to be distributed, by:
- checking the at least one specified rule for syntactical validity;
- rejecting the at least one specified rule when a syntactical error exists;
- checking the at least one specified rule for a distribution indication;
- evaluating the at least one specified rule locally when no distribution indication exists;
- determining a remote intermediate network element to distribute the at least one specified rule to;
- locally evaluating the at least one specified rule when no remote intermediate network element is determined to exist;
- checking whether the remote intermediate network element contains a special package required by the at least one specified rule;
- locally evaluating the at least one specified rule when the remote intermediate network element does not have the special package required by the at least one specified rule; and
- distributing the at least one specified rule to the remote intermediate network element.

21. The network control framework method as recited in claim 18, further comprising:

determining a remote intermediate network element that the at least one specified rule is to be distributed to given a predetermined distribution indication, by:
- locating a signature in a predetermined data format with a matching starting point, endpoint and transmission protocol;
- determining that no remote intermediate network element exists when no predetermined data format is located;
- setting a temporary variable as a specified number of intermediate network elements between a specified endpoint in the predetermined distribution indication;
- setting the temporary variable to a value of the specified number of intermediate network elements in the predetermined data format when a specified number of intermediate network elements towards or from the endpoint in the predetermined distribution indication is greater than a number of intermediate network elements towards or from the specified ending point in the distribution indication, wherein the predetermined distribution indication comprises a specification of the endpoint and a specification of the number of intermediate network elements to the endpoint, set the temporary variable to a value equal to the number of intermediate network elements given in the predetermined data format minus an original value of the temporary variable, wherein the distribution indication comprises a specification of the endpoint and the specification of the number of intermediate network elements from the endpoint, and sets the temporary variable to a value equal to the original value in the temporary variable less by one;

declaring the remote intermediate network element to be the network element specified in a signature stored in the predetermined data format in which the signature has an index in an array of signatures in the predetermined data format equal to the value stored in the temporary variable; and declaring that no remote intermediate network element exists when an index equal to the value stored in the temporary variable in the array of signatures in the predetermined data format does not exist.

* * * * *